(12) United States Patent
Nelmes et al.

(10) Patent No.: US 12,141,169 B1
(45) Date of Patent: Nov. 12, 2024

(54) SYSTEM AND METHOD FOR CONVERTING SPREADSHEETS INTO DATA MODELS

(71) Applicant: Anaplan, Inc., San Francisco, CA (US)

(72) Inventors: Andrew Thomas Nelmes, London (GB); Alexandros Komninos, York (GB); Robin Ward Stafford, York (GB); Jonathan Co, York (GB)

(73) Assignee: Anaplan, Inc., San Francisco, CA (US)

( * ) Notice: Subject to any disclaimer, the term of this patent is extended or adjusted under 35 U.S.C. 154(b) by 366 days.

(21) Appl. No.: 17/576,205

(22) Filed: Jan. 14, 2022

(51) Int. Cl.
*G06F 16/00* (2019.01)
*G06F 16/25* (2019.01)
*G06F 16/28* (2019.01)
*G06F 40/18* (2020.01)
*G06F 40/30* (2020.01)

(52) U.S. Cl.
CPC .......... *G06F 16/283* (2019.01); *G06F 16/258* (2019.01); *G06F 40/18* (2020.01); *G06F 40/30* (2020.01)

(58) Field of Classification Search
CPC ...... G06F 16/248; G06F 16/283; G06F 40/18; Y10S 707/957
See application file for complete search history.

(56) References Cited

U.S. PATENT DOCUMENTS

| | | | |
|---|---|---|---|
| 11,210,463 B2 | 12/2021 | Stafford et al. | |
| 2007/0061344 A1* | 3/2007 | Dickerman | G06F 40/18 |
| 2013/0262974 A1* | 10/2013 | Anstis | G06F 40/18 |
| | | | 715/217 |
| 2015/0095312 A1* | 4/2015 | Gulwani | G06F 16/284 |
| | | | 707/722 |
| 2021/0149919 A1 | 5/2021 | Nelmes et al. | |
| 2021/0149920 A1 | 5/2021 | Nelmes et al. | |
| 2021/0149926 A1 | 5/2021 | Komninos et al. | |
| 2021/0150139 A1 | 5/2021 | Stafford et al. | |

OTHER PUBLICATIONS

T.J. Jankun-Kelly et al. Visualization Exploration and Encapsulation via a Spreadsheet-Like Interface, IEEE Transactions On Visualization, vol. 7, No. 3, Jul.-Sep. 2001. (Year: 2001).*

* cited by examiner

*Primary Examiner* — Cheryl Lewis

(74) *Attorney, Agent, or Firm* — Chamberlain, Hrdlicka, White, Williams & Aughtry; Aly Z. Dossa

(57) ABSTRACT

A method for converting a spreadsheet into a data model includes: obtaining the spreadsheet including a plurality of cells containing data; identifying local structures within the spreadsheet using attributes of the data in the spreadsheet; combining the local structures of the spreadsheet into a generic multi-dimensional model comprising dimensions and data cubes; generating the data model using the generic multi-dimensional model by mapping elements of the generic multi-dimensional model to elements of the data model; and displaying, on a display and to a user, the data model. The dimensions and the data cubes are the elements of the generic multi-dimensional model.

11 Claims, 15 Drawing Sheets

Figure 3.4:
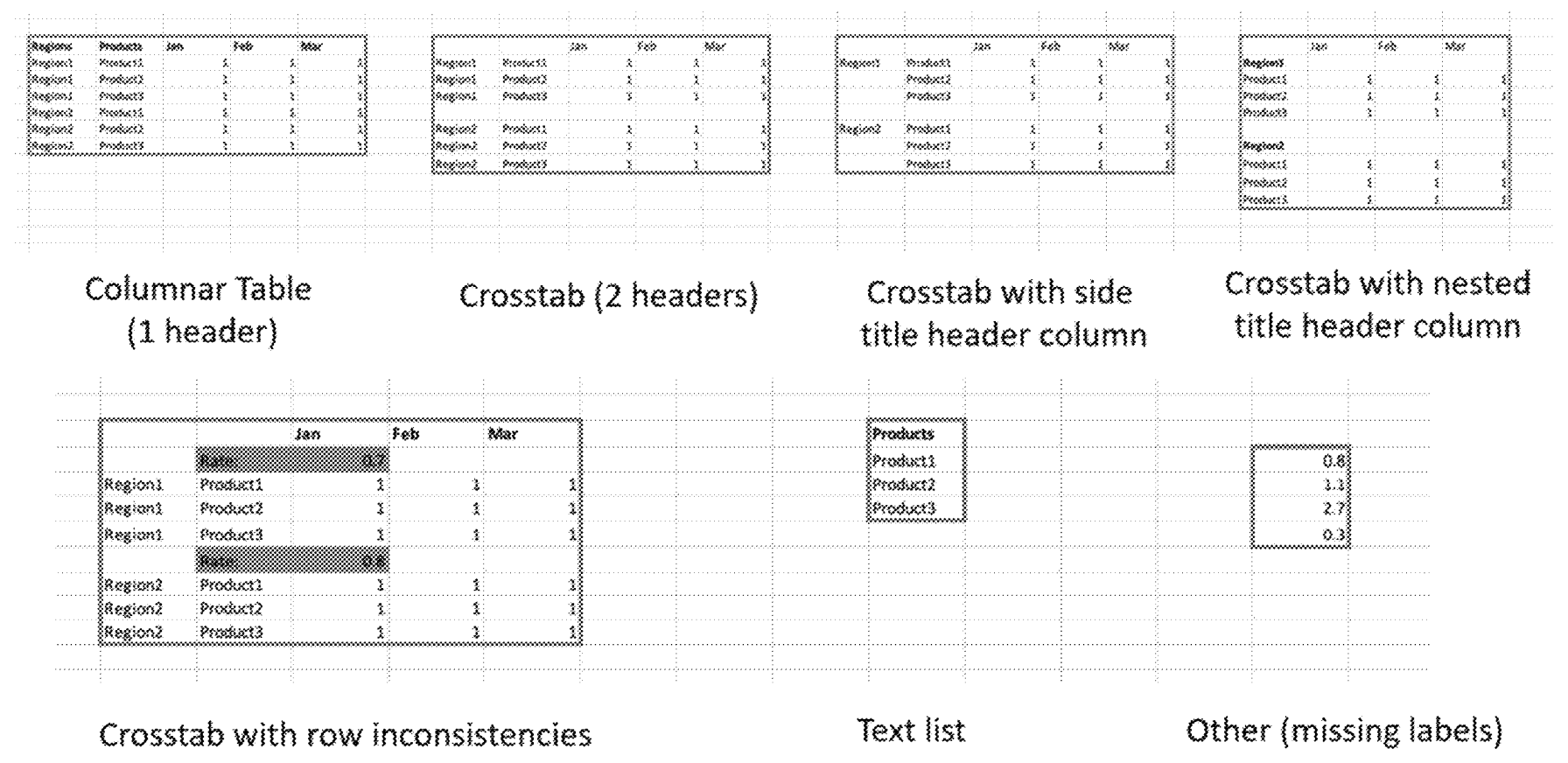

Columnar Table (1 header) | Crosstab (2 headers) | Crosstab with side title header column | Crosstab with nested title header column Crosstab with row inconsistencies | Text list | Other (missing labels)

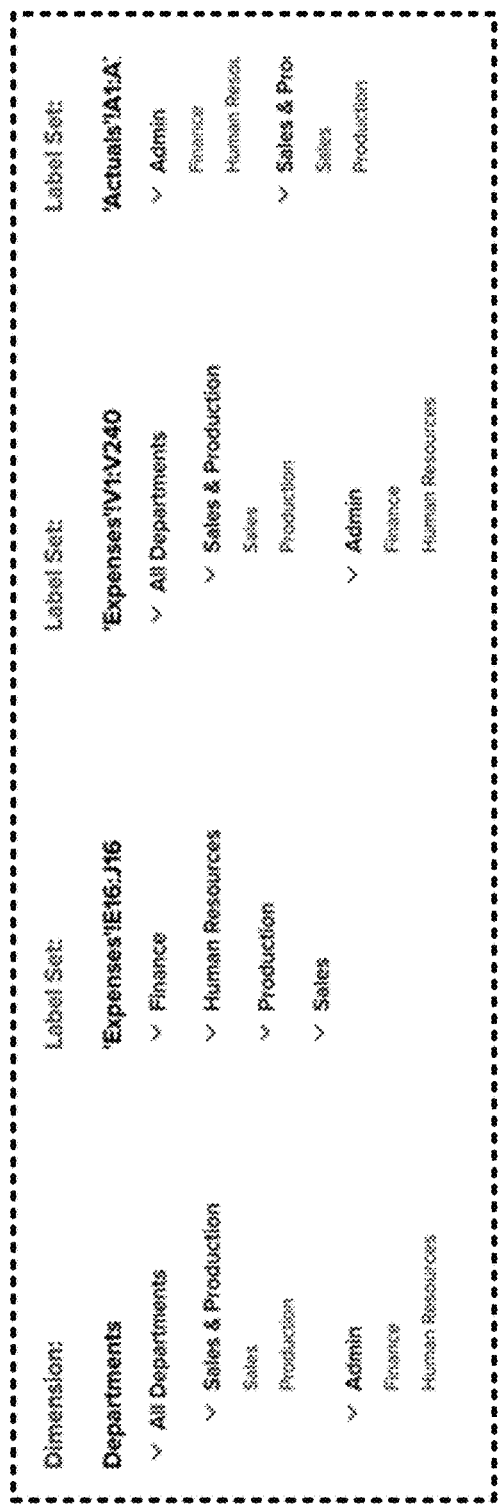
FIG. 6.1

FIG. 6.2

FIG. 6.3

○ Label Sets to Dimensions  ○ Blocks with Dimensions  ○ Blocks to Cubes  ● Cubes with Dimensions  ○ Line Items  ○ Time  ○ Versions

Cubes with Dimensions

| | FY 2022 | V2 | All Products | One | Departr | Month Year | Product Name | Location Dec21 | All Cubes - Margin |
|---|---|---|---|---|---|---|---|---|---|
| Prices and Cost Assumptions | ✓ | ✓ | ✓ | | | | | | |
| Discount Assumptions | | ✓ | ✓ | | | | | | |
| All Cities - Margin | | | | | | | | | ✓ |
| Constants | ✓ | ✓ | ✓ | ✓ | | | | | |
| Expense Assumptions | | ✓ | | | ✓ | | | | |
| Benefits % Assumptions | ✓ | ✓ | | | ✓ | | | | |
| Expenses | ✓ | ✓ | | | ✓ | ✓ | | | |
| Profit | | | | | | | ✓ | ✓ | |
| Expenses Actuals | | | | | | | ✓ | ✓ | |
| Sales Actuals | | | | | | | ✓ | ✓ | |

FIG. 6.4

| Cube/Line Item | Formulas | Formula |
|---|---|---|
| ∨ Price and Cost Assumptions | 2 | |
|     Unit Price | | |
|     Unit Cost | | |
| ∨ Discount Assumptions | 3 | |
|     Volume Threshold | | |
|     High Discount % | | |
|     Low Discount% | | |
| ∨ All Cities - Margin | 8 | |
|     Units Sold | | |
|     Sales Before Discount | | Units Sold * Unit Price |
|     Discount % | | IF( Units Sold > Volume Threshold , High Discount % , Low Discount% ) |
|     Discount | | Sales Before Discount * Discount % |
|     Sales After Discount | | Sales Before Discount - Discount |
|     Cost of Sales | | Units Sold * Unit Cost |
|     Margin | | Sales After Discount - Cost of Sales |
|     Margin % | | Margin / Sales After Discount |
| > Constants | 2 | |
| ∨ Expense Assumptions | 3 | |
|     Pension % | | |
|     Employer Tax % | | |
|     Facilities Costs Per person | | |
| > Benefits % Assumptions | 1 | |
| > Expenses | 15 | |
| > Profit | 7 | |
| > Expenses Actuals | 8 | |
| > Sales Actuals | 2 | |

FIG. 6.5

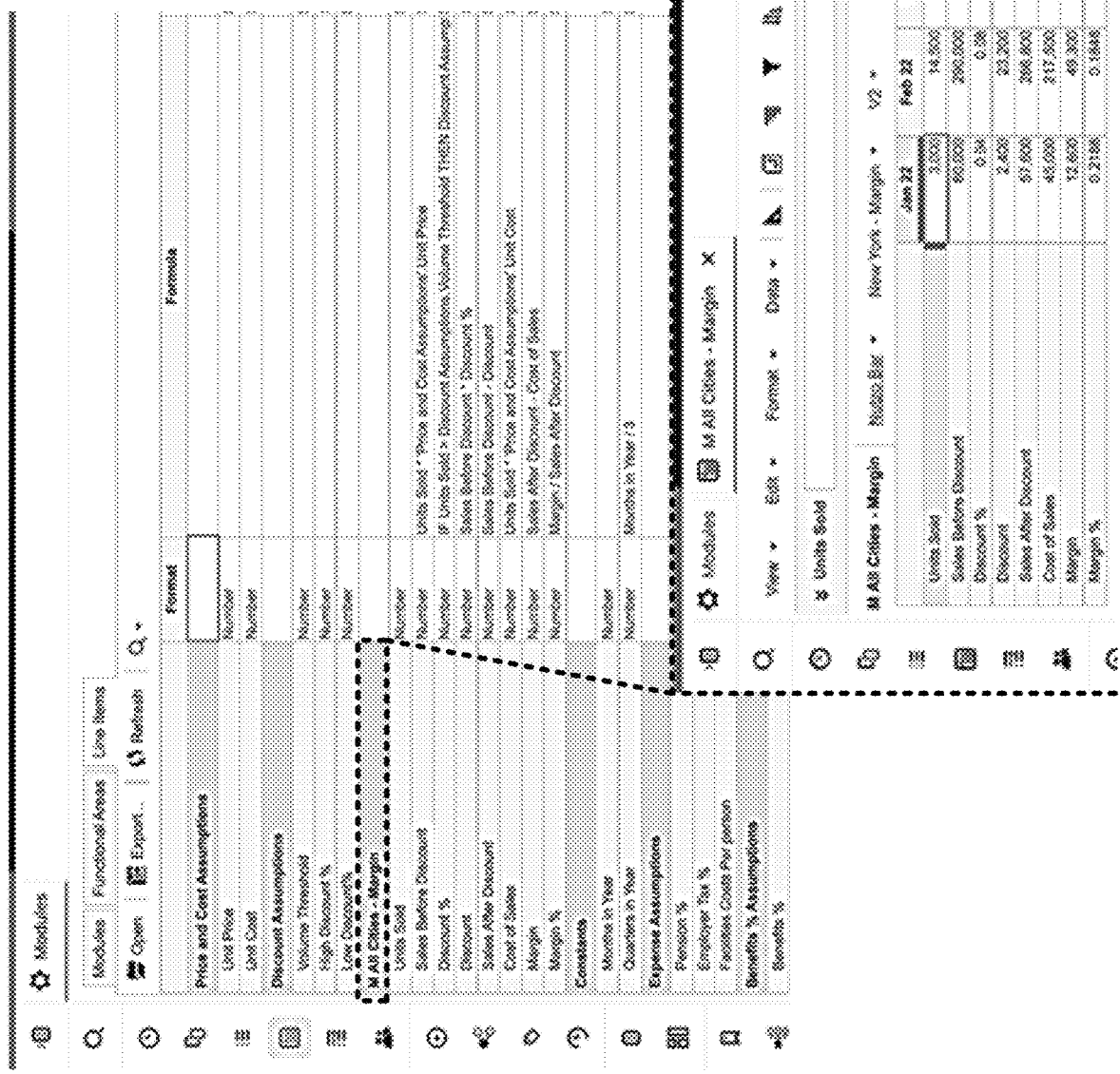
FIG. 6.6

SYSTEM AND METHOD FOR CONVERTING SPREADSHEETS INTO DATA MODELS

BACKGROUND

Spreadsheets contain semi-structured data where certain relations between the data are explicit while others are implicit. Spreadsheets can also be large, incomplete, and inconsistent in design. As a results, users may wish to be able to find more effective ways for presenting data contained in spreadsheets.

SUMMARY

In general, certain embodiments described herein relate to a method for converting a spreadsheet into a data model, the method comprising: obtaining the spreadsheet, wherein the spreadsheet comprises a plurality of cells containing data; identifying local structures within the spreadsheet using attributes of the data in the spreadsheet; combining the local structures of the spreadsheet into a generic multi-dimensional model comprising dimensions and data cubes; generating the data model using the generic multi-dimensional model by mapping elements of the generic multi-dimensional model to elements of the data model, wherein the dimensions and the data cubes are the elements of the generic multi-dimensional model; and displaying, on a display and to a user, the data model.

In general, certain embodiments described herein relate to a non-transitory computer readable medium (CRM) comprising computer readable program code, which when executed by a computer processor enables the computer processor to perform a method for converting a spreadsheet into a data model. The method comprising: obtaining the spreadsheet, wherein the spreadsheet comprises a plurality of cells containing data; identifying local structures within the spreadsheet using attributes of the data in the spreadsheet; combining the local structures of the spreadsheet into a generic multi-dimensional model comprising dimensions and data cubes; generating the data model using the generic multi-dimensional model by mapping elements of the generic multi-dimensional model to elements of the data model, wherein the dimensions and the data cubes are the elements of the generic multi-dimensional model; and displaying, on a display and to a user, the data model.

In general, certain embodiments described herein relate to a computing device configured for converting a spreadsheet into a data model. The computing device comprises: a memory storing a spreadsheet; and a processor coupled to the memory. The processor is configured to convert the spreadsheet into a data model by: obtaining the spreadsheet, wherein the spreadsheet comprises a plurality of cells containing data; identifying local structures within the spreadsheet using attributes of the data in the spreadsheet; combining the local structures of the spreadsheet into a generic multi-dimensional model comprising dimensions and data cubes; generating the data model using the generic multi-dimensional model by mapping elements of the generic multi-dimensional model to elements of the data model, wherein the dimensions and the data cubes are the elements of the generic multi-dimensional model; and displaying, on a display and to a user, the data model.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 5 shows an implementation example in accordance with one or more embodiments.

FIGS. 6.1-6.6 show an implementation example in accordance with one or more embodiments.

DETAILED DESCRIPTION

Figure 1:
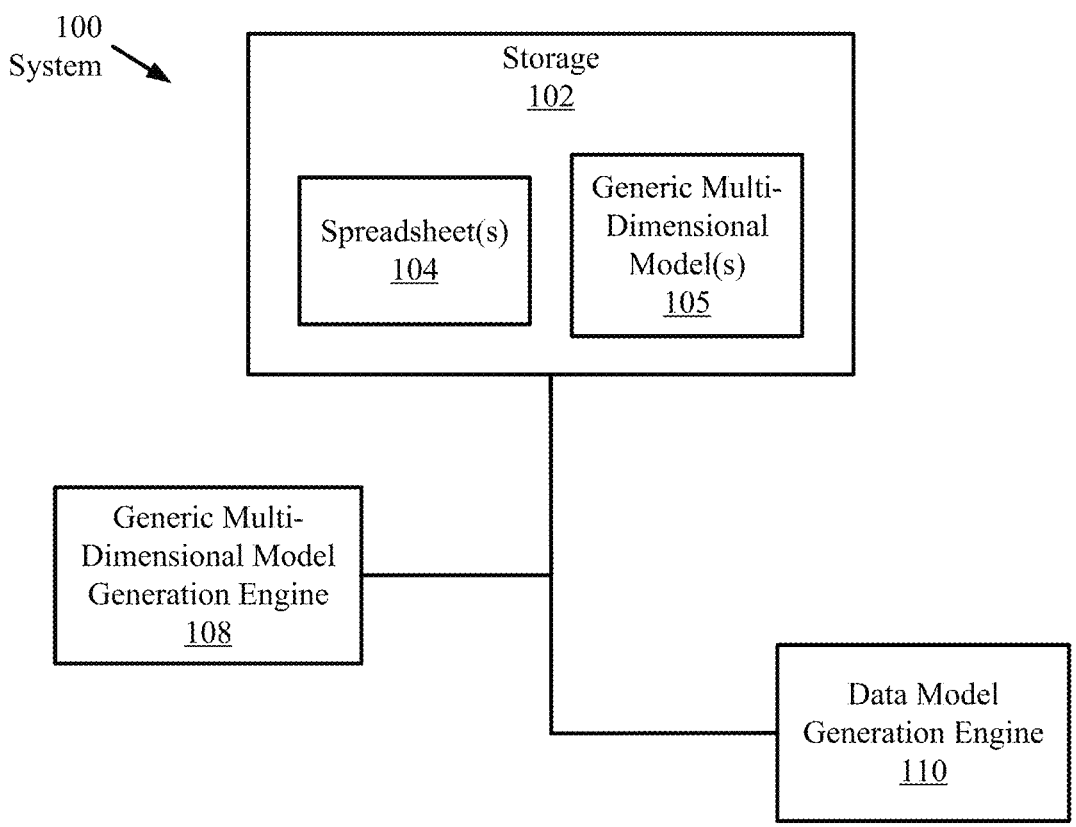
FIG. 1 shows a system in accordance with one or more embodiments.

Specific embodiments will now be described with reference to the accompanying figures.

In the below description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

One or more embodiments disclosed are directed systems and methods for converting spreadsheets into data models. In particular, in one or more embodiments disclosed herein, data contained in a spreadsheet may be transformed into a generic multi-dimensional model where the data is organized into dimensions and data cubes. These elements of the generic multi-dimensional model (e.g., the dimensions and data cubes) may then be mapped with elements (e.g., modules) of a data model to generate a data model for presenting the data contained in the spreadsheet. The data model may be nay type of model that organizes elements of data and standardizes how the data relate to one another and to the properties of real-world entities (e.g., companies, businesses, etc.). For example, the data model may be, but is not limited to, a data model created by and specific to Anaplan, Inc.

Various embodiments of the disclosure are described below.

FIG. 1 shows a system (100) in accordance with one or more embodiments. The system includes a storage (102), a generic multi-dimensional model generation engine (108), and a data model generation engine (110). In one or more embodiments disclosed herein, the system (100) may be part of a computing system (e.g., 700, FIG. 7). Each of these components of the system (100) will be described in more detail below.

As shown in FIG. 1, the system (100) includes the storage (102). The storage (102) may be implemented using volatile or non-volatile storage or any combination thereof. The storage (102) is configured to store one or more spreadsheets (104) and one or more generic multi-dimensional model(s). In one or more embodiments, each of the spreadsheets (104) may be an electronic document in which data is arranged in the rows and columns of a grid and can be manipulated and used in calculations (e.g., one or more Microsoft® Excel documents with one or more worksheet tabs, etc.).

In one or more embodiments, each of the generic multi-dimensional models (105) may be a data model template where data may be viewed in the form of data cubes including one or more dimensions. Each dimension of a multi-dimensional model (105) may specify an item, measure, or characteristic of data that can be obtained, calculated or manipulated. Examples of dimensions may include, but are not limited to, geographic location, time, organization, users, versions, etc. In one or more embodiments, data cubes may be created when data (e.g., data arranged as one or more dimensions) is grouped or combined into multi-dimensional matrices showing a correlation between the grouped or combined data. Examples of dimensions and data cubes are shown in more detail below in reference to FIGS. 6.1-6.6.

In one or more embodiments disclosed herein, the system (100) further includes the generic multi-dimensional model generation engine (108). The generic multi-dimensional model generation engine (108) may be implemented in hardware (i.e., circuitry), software, or any combination thereof. In one or more embodiments, the generic multi-dimensional model generation engine (108) may be configured to execute one or more processes to convert one or more spreadsheets (104) into one or more generic multi-dimensional models (105). Additional details of the processes executed by generic multi-dimensional model generation engine (108) are discussed below in reference to FIG. 2.

In one or more embodiments disclosed herein, the system (100) further includes the data model generation engine (110). The data model generation engine (110) may be implemented in hardware (i.e., circuitry), software, or any combination thereof. In one or more embodiments, the data model generation engine (110) may be configured to execute one or more processes to convert one or more generic multi-dimensional models (105) into one or more data models. Additional details of the feature extraction processes executed by the data model generation engine (110) are discussed below in reference to FIG. 2.

Although the system (100) is shown as having three components (102, 108, 110), in other embodiments of the invention, the system (100) may have more or fewer components (e.g., a display engine for displaying the extracted features to a user of the system (100)). Further, the functionality of each component described above may be split across components or combined into a single component (e.g., the functionalities of the generic multi-dimensional model generation engine (108) and the data model generation engine (110) may be combined to be implanted by a single component). Further still, each component (102, 108, 110) may be utilized multiple times to carry out an iterative operation.

Figure 2:
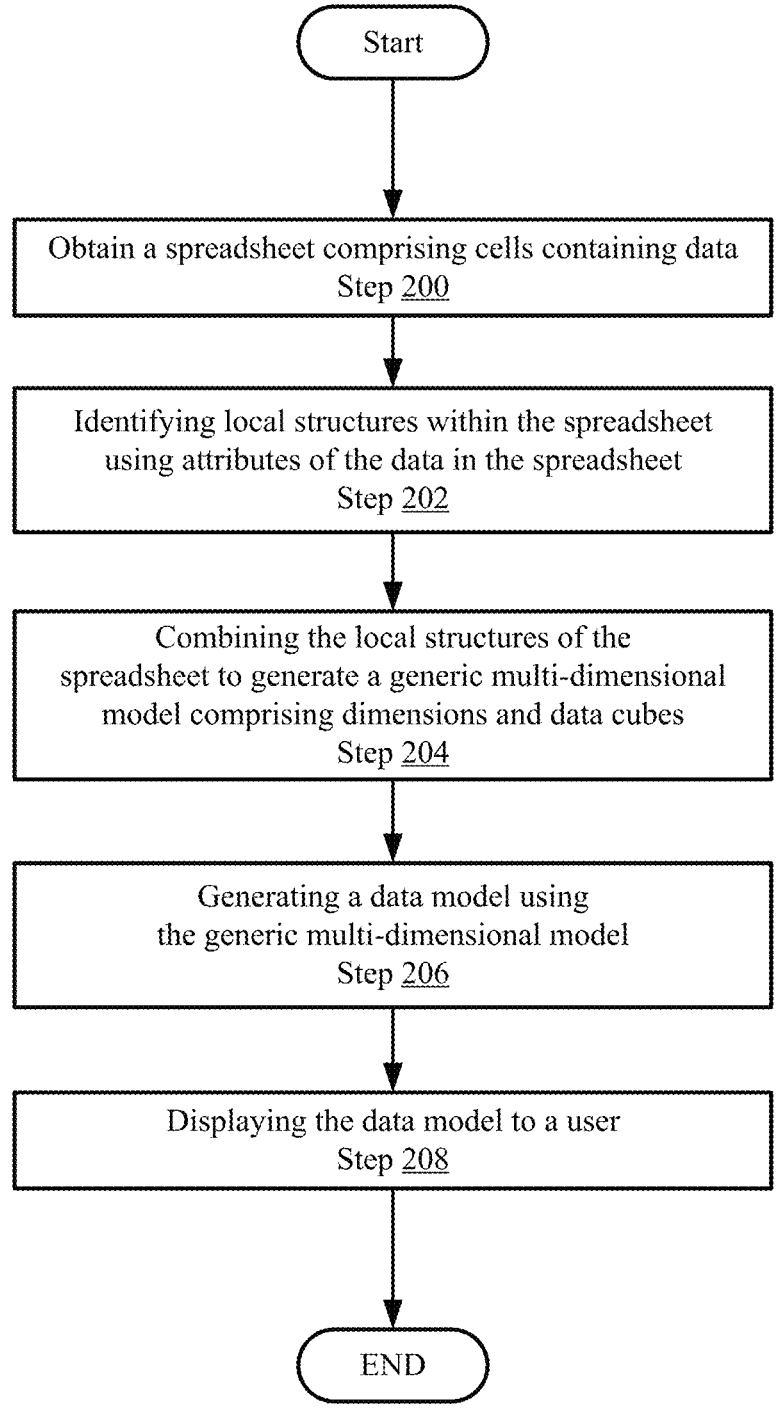
FIG. 2 shows a flowchart in accordance with one or more embodiments.

Turning now to FIG. 2, FIG. 2 shows a flowchart of a process for converting one or more spreadsheets (e.g., 104, FIG. 1) into a generic multi-dimensional data model (e.g., 105, FIG. 1) in accordance with one or more embodiments disclosed herein. The method shown in FIG. 2 may be performed, for example, by a combination of the generic multi-dimensional model generation engine (e.g., 108, FIG. 1) and the data model generation engine (e.g., 110, FIG. 1). While FIG. 2 is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 200, a spreadsheet (or one or more spreadsheets including multiple worksheet tabs) is obtained. In one or more embodiments, the spreadsheet may be obtained from any source (e.g., a local computer, a network, an external storage device, etc.). In one or more embodiments, the spreadsheet may be pre-stored in the storage (e.g., 102, FIG. 1). The obtained spreadsheet may include one or more cells containing data, one or more graphics (e.g., diagrams, charts, pivot tables, etc.) created using the data in the one or more cells, or a combination of both of these elements.

In one or more embodiments, upon obtaining the spreadsheet, the spreadsheet is analyzed to identify and extract attributes of the data contained in the spreadsheet. The attributes of the data contained in the spreadsheet may include, but are not limited to: cached values and their types, styles, formats, merged cells, pivot tables including their location and source data, formulas, external file references, named ranges, etc. The elements may be identified and extracted using open source programs, such as but not limited to, Python (e.g., using the openpyxl Python library). In one or more embodiments, numeric types of data contained within cells making up the spreadsheet may also be detected, and different cell range formats within the spreadsheet may be transformed into a single consistent format (e.g., displaying the data in the spreadsheet with a same number of decimal places, with a same color, with a same size font, etc.).

In Step 202, local structures within the spreadsheet obtained in Step 200 are identified using the attributes of the data contained in the spreadsheet. In one or more embodiments, the local structures may include, but are not limited to, data blocks and label sets associated with the data contained in the spreadsheet. Each data block may be one or more groups of related cells that are associated with one another based on a layout of the cells. Each label set may be a group of like labels that could be grouped into a dimension. Examples of data blocks and label sets are shown in more detail below in reference to FIGS. 3.1-3.4.

In one or more embodiments, each data block may be identified based on a layout (e.g., a cell arrangement) of the cells (also referred to herein as "cell layout") and a cell type of each of the cells. In one or more embodiments, each cell may be classified into one or more cell types including, but are not limited to, data cells, label cells, empty cells, other cells, etc. Data cells may include all cells that include only numeric characters while label cells may include all cells that include a combination of numeric and non-numeric characters. Empty cells may be cells that include no data. Other cells may be all remaining cells that do not qualify as any one of a data cell, a label cell, or an empty cell. Examples of different cell types are shown in more detail below in reference to FIGS. 3.1-3.4.

In one or more embodiments, identifying the data blocks using the cell layout and cell types may be divided into three stages. In the first stage (i.e., Stage 1), bounding boxes may be created around all data-containing cells (i.e., any cells containing numerical data, non-numerical data, and/or a combination of both numerical and non-numerical data) that are connected to one another. Any empty cells that are in direct connection with one or more data-containing cells may also be bound by a bounding box that is bounding the one or more data-containing cells. Any overlapping bounding boxes may be merged in Stage 1, and a set of initial data blocks are initialized using the bounding boxes (e.g., each bounding box is not an initial data block). An example of Stage 1 is shown below in more detail with reference to FIG. 3.1.

In one or more embodiments, in the second stage (e.g., Stage 2), initial data blocks identified in Stage 1 are combined (e.g., merged). In particular, each cells in the initial data blocks identified in Stage 1 are classified as at least one cell type (e.g., data cell, label cell, empty cell, other cell, etc.). Cells may be classified as one or more of the cell types using, for example but not limited to, machine learning classifiers, heuristic analysis, a set of preset rules, etc. Cells may also be classified as one or more cells types by identifying features (e.g., Excel features such as data types, series of consecutive numbers, specific values, formats and styles, etc.) of the content (e.g., data) contained within the cells.

Additionally, in Stage 2, data cells that are labeled using label cells may be identified on a row and column axis basis. If an initial data blocks is detected as being incomplete (e.g., a group of bound data cells that are not associated with any label cells in a column axis, etc.) based on a given axis, the initial data block is expanded top or right until another initial data block is found and the two initial data blocks are merged. The merging of two initial data blocks may be aborted if an inconsistency (shown and described in more detail below in reference to FIG. 3.2) is detected in the cell types making up the initial data blocks based on a row-wise and column-wise basis. An example of the initial data blocks merging process is shown below in more detail with reference to FIG. 3.2.

In one or more embodiments, in Stage 3, the merged initial data blocks in Stage 2 may be further merged with one or more initial data blocks delimiting cells that include metadata (e.g., titles, secondary headers, etc.) to form complete data blocks. For example, for each merged bounding box formed in Stage 2, the bounding box is expanded first top then right within a preset maximum distance to find one or more neighbor initial data blocks that includes a title and/or a header. An example of the Stage 3 data block merging process is shown below in more detail with reference to FIG. 3.3.

Although the above data block identification process is described using three stages, one of ordinary skill in the art would appreciate that the data block identification process is not limited to being divided into three stages. In particular, the data block identification process may be divided into any number of stages including the above-discussed step (presented in any order) without departing from the scope of one or more embodiments disclosed herein.

In one or more embodiments, once the data blocks have been identified, the structure of each data block is analyzed. More specifically, cell relations within each identified data blocks may be determined to, for example, classify each block with a block type, identify and handle any inconsistencies between the cells making up each data block, handle irregular headers (e.g., identifying sub-headers that are mistakenly identified as main headers), and identify a title for each identified data block. In one or more embodiments, levels may also be extracted from each data block. A level may be a group of data at the same level in a hierarchy. For example, consider the hierarchy shown below. The cities (Houston, Miami, Los Angeles, Ottawa) may comprise one level, the states/provinces may comprise another level, and the countries may comprise yet another level.

Start of Example
  USA
    Texas
      Houston
    Florida
      Miami
    California
      Los Angeles
  Canada
    Ontario
      Ottawa
End of Example In one or more embodiments, analyzing the structure of each identified data block may also include grouping one or more label cells that are identified as labeling one or more data cells into a label tuple. Each data cell may them be associated with a label tuple (e.g., indexing data with labels). Examples of different block types are shown in more detail below in reference to FIG. 3.4.

In one or more embodiments, the identified label tuples may be used to transform formulas contained in one or more cells of an identified data block. More specifically, spreadsheet formulas may reference each cell with a column and row index (e.g., using A1 indexing). As discussed in the previous paragraph, in one or more embodiments, data blocks may index data cells with label tuples. Using the label tuples, formulas contained in one or more cells may be transformed from the A1 indexing scheme using in spreadsheets into one or more initial rules. For example, assume that a cell in the spreadsheet contains a formula "D10=D8-D9" where each cell (e.g., D10, D8, D9) is indexed (i.e., associated) with a label tuple. Further assume that replacing the cell number with their respective label tuples results in the following formula "['Nutzo Bar', 'Margin', 'January 2022']=['Nutzo Bar', 'Sales', ' January 2022']−['Nutzo Bar', 'Cost', 'January 2022']". Identical labels (e.g., "Nutzo Bar" and "January 2022") between the right-hand-side and left-hand-side of this formula may then be removed to generate an initial rule of "Margin=Sales−Cost".

In one or more embodiments, spreadsheet lookup functions (e.g., VLOOKUP, XLOOKUP, etc.) may first be resolved before the cells are substituted with their respective label tuples. This replaces the lookup function with simple cell references. Additionally, aggregations between labels within the same tuples may be taken as indication of hierarchical relations (e.g., "Q1 2022=January 2022+February 2022+March 2022"). An example of transforming formulas into initial rules and grouping the initials rules into hierarchical relations is shown in more detail below in reference to FIG. 4.

In one or more embodiments, label sets may be extracted from data blocks once the data blocks are identified. These label sets are one of the local structures within the spreadsheet identified in Step 202 along with the data blocks. A level may be an example of a flat label set (i.e., a label set where there is only a single level). For example, in the example hierarchy discussed above as an example for a level, if there were only cities (and no states or countries), the example hierarchy would be considered a flat label set. Multiple levels that are group together form a single label set. The label sets may be extracted from data blocks based on the structure of the data blocks by applying, for example but not limited to, semantic analysis and structural analysis to each identified data block.

In one or more embodiments, applying semantic analysis to identify label sets may also include classifying each identified level with a semantic type and a semantic subtype (e.g., type=Region, subtype=Country). Each type and subtype may be extended with domain specific information (e.g., type=Product, subtype=Software). Once the levels are classified, a similarity-based classification with a predetermined similarity threshold may be applied to detect labels of unknown types. Each level may also be assigned a similarity score based on its similarity to another label. Such a similarity score may be calculated using, for example but not limited to: regular expression matching, term overlap, number of exact matches, similarity scores obtained from open-source semantic models, etc.

In one or more embodiments, scores of different feature types may be added to an overall similarity score for each feature type and each pattern/similarity type may contribute towards identifying a specific feature type with a given weight. Using this information, optimal weights may be estimated from the data. In one or more embodiments, a feature type may be an attribute (e.g., a row, column, font, color, size, format, semantic type of text, etc.) of a cell. To determine which cells go together, these feature types may be compared and the most similar ones grouped together using the above-discussed scoring process.

In one or more embodiments, hierarchical relations and name attributes between levels may be detected to form each of the label sets. For example, for a pair of levels, an association score may be computed based on factors such as, but are not limited to: semantic type compatibility, a 1:N or 1:1 relation, distance of the levels within the data block including the levels, a string similarity between the levels, an aggregation formula association, etc. If the association score exceeds a predefined association score threshold, the pair of levels may be combined. Additionally, in one or more embodiments, clusters may be formed from all combined pair of levels. A cluster may be a hierarchical data set where groups of labels are clustered into a hierarchical structure (e.g., the example hierarchy presented above to show an example of a level). An example of label sets and clusters formed using levels is shown in more detail below in reference to FIG. 5.

In one or more embodiments, multiple levels making up a label set may have hierarchical relations. These levels may also be part of a "name/description" attribute. In one or more embodiments, to create a hierarchy for the levels making up a label set, the levels should be in a N:1 relation with one another; or a known formula aggregation or hierarchy exists between the semantic type of each level (e.g., month-year).

In one or more embodiments, levels may be processed from left-to-right of a spreadsheet and merged into one or more hierarchies based on one or more of the above condition being satisfied. All remaining levels not merged into a hierarchy may then be processed from a right-to-left basis within the spreadsheet to generate additional hierarchies. In one or more embodiments, the condition for a level to be a name attribute may be to be in a 1:1 relation with another level.

In one or more embodiments, one label set per data block may be chosen to identify one or more line items of the data block In one or more embodiments, a line item may be an item in a special label set that requires a calculation or in which data is stored. For example, in a financial model where (January, February, March), (London, Tokyo, New York) and (Cost, Price, Profit Margin, Profit %) are all label sets, the label set of (Cost, Price, Profit Margin, Profit %) are line items because they represent abstract constructs that are required either to be calculated or have data stored against them. In one or more embodiments, line item properties may be assigned to one or more label sets that: are not classified with an incompatible semantic type (e.g., time); have the most left-hand side label in rules (e.g., for the rule "Margin=Sales−Cost", the label set containing "Margin" will get a point); are most closely related to a "measures semantic type" (e.g., semantic types associated with terms such as price, cost, revenue, volume, length, duration, etc.); and have associated data cells with the most consistent data type (e.g., integer, float, Boolean, etc.) and formatting (e.g., percentage, number of decimal points, etc.).

In one or more embodiments, formulas may be transformed across blocks. For example, a formula in a spreadsheet consists of cell references. As discussed above, in one or more embodiments, formulas are transformed into a line item that refers to other line items which may themselves be calculated from a formula (e.g., Margin=Sales−Cost as discussed above). In one or more embodiments, formulas in different blocks that have the same form (e.g., result=A−B) may be same depending on which members (e.g., line items and/or labels) represents A and B. The blocks including these same formulas may be combined by transforming the formulas across the blocks.

In Step 204, the local structures of the spreadsheet are combined to generate a generic multi-dimensional model comprising dimensions and data cubes. In one or more embodiments, the local structures (e.g., the data blocks, the label sets with hierarchies, the line items and labeled indexed formulas within the data blocks) may be consolidated (in a per data block basis) to form the dimensions of the generic multi-dimensional model. The dimensions may then be used to form the data cubes.

In one or more embodiments, the dimensions may be formed by identifying common label sets. Common label sets may be identified by computing a member overlap score for a group of one or more label sets. Groups of label sets with a member overlap score that exceed a predetermined member overlap score threshold may then be combined into dimensions. An example showing label sets being grouped into dimensions is shown below in reference to FIG. 6.1.

In one or more embodiments, data cubes may be formed by flattening one or more data blocks (e.g., combining two or more blocks into a single cube) and merging the flattened data blocks that contain the same dimensions and identical ones of the line items. For example, there may be three separate blocks for three cities (e.g., New York, London, and Tokyo) that may be combined into a single cube with a "cities" dimension that has three members (New York, London, and Tokyo). An example showing data blocks being formed into data cubes and cubes being associated with dimensions is shown below in reference to FIGS. 6.2-6.5.

In one or more embodiments, dimensions may also be identified using a context of each data block (e.g., using a title of each data block or a title of a worksheet including the data block). This advantageously ensures that each row in a resulting data cube is indexed by a unique one of a member tuple. In one or more embodiments, a member tuple describes the location of a cell of data. For example, in spreadsheets, cells are referred to by their horizontal and vertical locations (e.g., A34). In the generic multi-dimensional model, the cell of data may be described based on its labels. For example, a cell with a value "70" described using the labels "January" and "New York" may have a member tuple of "(January, New York)."

In one or more embodiments, in the generic multi-dimensional model, the identified line items may also be associated with one or more of the initial rules that were transformed using formulas. An example of this is shown below in reference to FIG. 6.5.

In Step 206, a data model is generated using the generic multi-dimensional model. In one or more embodiments, the data model may be generated by mapping elements of the multi-dimensional model (e.g., the dimensions and data cubes) to elements of the data model (e.g., modules of the data model). For example, the dimensions may be mapped to one or more lists and/or system modules of the data model. Similarly, each data cube may also be mapped to specific modules of the data model. Furthermore, the rules transformed from the formulas in the spreadsheet may be indexed by list elements of the data model. One of ordinary skill in the art would appreciate that the mapping of the elements between the multi-dimensional model and the data model will depend on the specific structure and make up (e.g., the types of lists and modules) of the data model. An example of a resulting data model formed from a spreadsheet is shown below in reference to FIG. 6.6.

In Step 208, the generated data model is displayed on a display to a user. The user may then advantageously use the data model to infer information about the data contained in the original spreadsheet that could not be readily inferred from data when the data was being presented in the spreadsheet form.

Figure 3:
FIGS. 3.1-3.4 show an implementation example in accordance with one or more embodiments.

To further clarify embodiments of the disclosure, a non-limiting working example is provided in FIGS. 3.1-3.4.
Start of Example Initially, FIG. 3.1 shows an example of Stage 1 in the data block identification process discussed above in reference to FIG. 2. More specifically, as shown in FIG. 3.1, connected cells are bound using bounding boxes (e.g., the dark solid lines) to form a plurality of initial data blocks. Each cell within each of the initial data blocks are also classified as either a label cell or a data cell. The data blocks in FIG. 3.1 also include multiple label sets. For example, one label set in FIG. 3.1 may be "January 2022, February 2022, March 2022, April 2022, May 2022, June 2022, July 2022, August 2022." Another label set may be "Coocoolicious, Cookie Crumbs, Nutzo Bars." Each of these label sets include one or more labels that label the data in the cells.

As shown in FIG. 3.1, the third initial data block from the top delimiting cells "A8:K:10" is identified as incomplete based on the cell layout and cell types of the cells making up the initial data block delimiting cells "A3:K:6". This is because the initial data block delimiting cells "A3:K:6" is identified as including a top row of label cells. This is a strong indication that the initial data block delimiting cells "A8:K:10" that includes a similar label cell and data cell layout except for the top row of label cells contains data that continues from the data contained in the initial data block delimiting cells "A3:K:6".

Turning to FIG. 3.2, the initial data blocks are merged as part of Stage 2 in the data block identification process discussed above in reference to FIG. 2. The initial data blocks are merged because the layout of the data cells and label cells in some of the data blocks were found to be consistent with one another.

Still referring to FIG. 3.2, an inconsistency would occur here if, for example, the data in cells "A8:K:10" were shifted one cell towards the right. This shift would cause the layout for these cells that make up one of the initial data blocks in FIG. 3.1 to be inconsistent with the layout of the cells in the initial data blocks above and under this initial data block. As a result of this inconsistency, these initial data blocks would not be merged as shown in the result of FIG. 3.2.

Turning now to FIG. 3.3, FIG. 3.3 shows the final merge executed in Stage 3 of the data block identification process discussed above in reference to FIG. 2. As shown in FIG. 3.3, the data blocks shown in FIG. 3.2 are merged based on the being combined with one or more data blocks containing a title (e.g., "Price and Cost Assumptions" and "Discount Assumptions").

Figure 4:
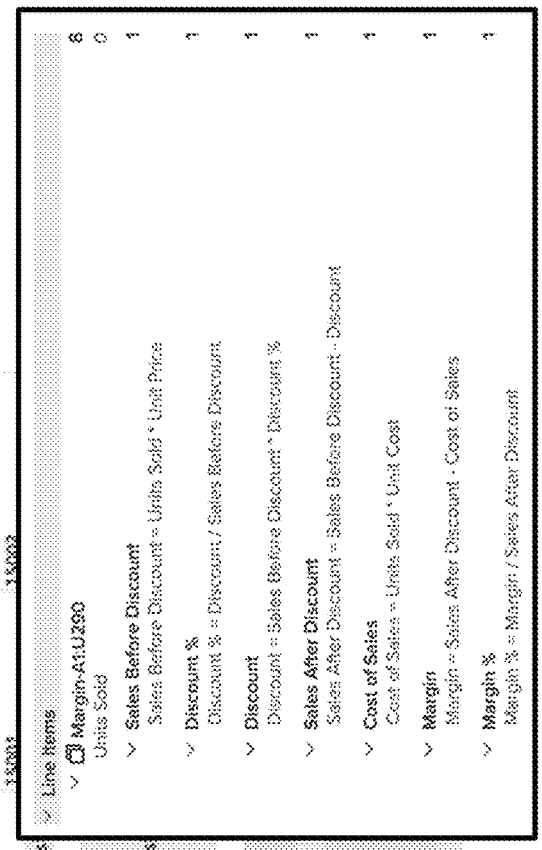
FIG. 4 shows an implementation example in accordance with one or more embodiments.
Figure 5:
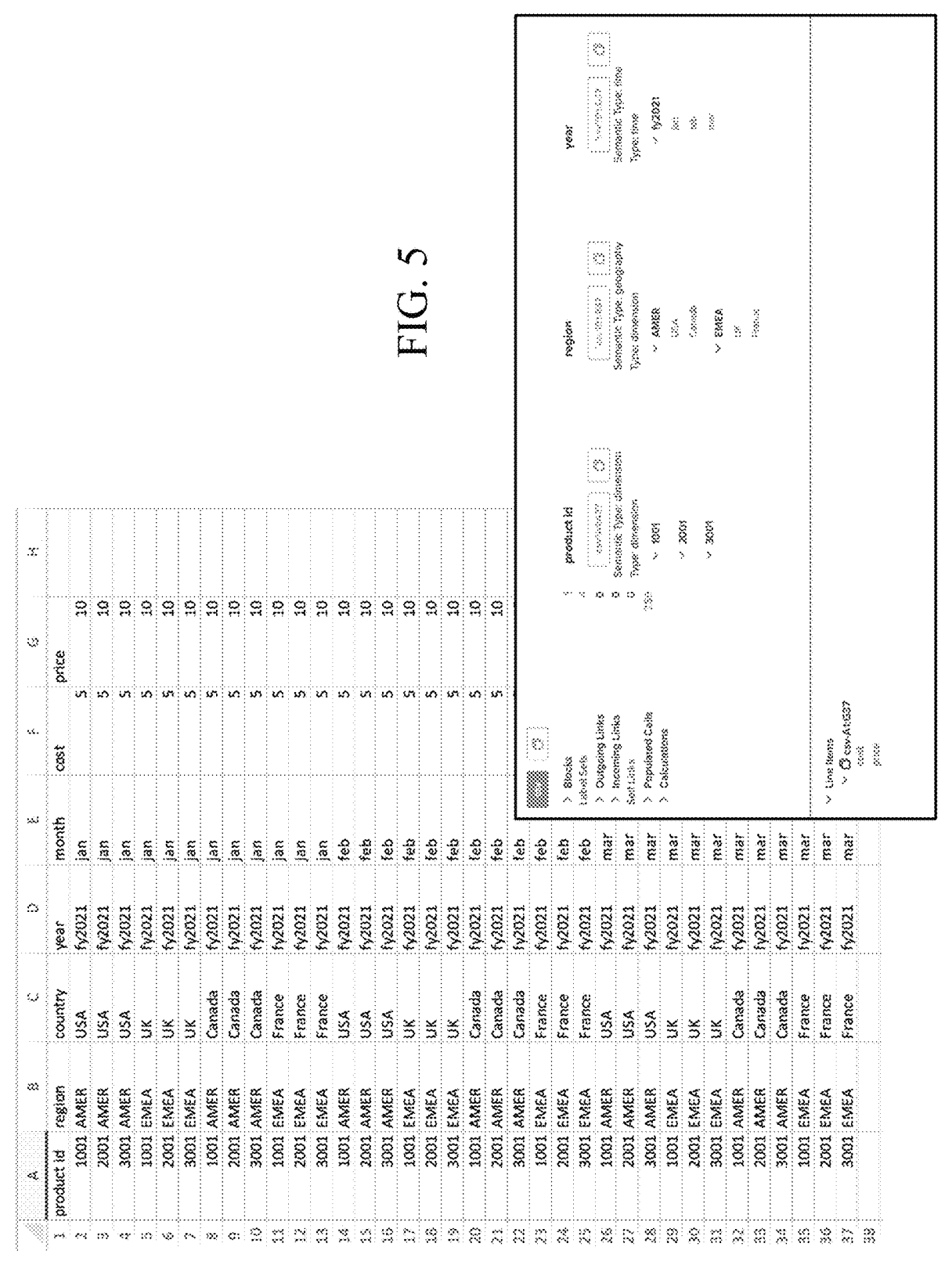

Finally, FIG. 3.4 shows examples of block types to which a completed data block may be classified. As shown in FIG. 3.4, each block type is described based on the layout of each cell type making up each respective data block.
End of Example To further clarify embodiments of the disclosure, a non-limiting working example is provided in FIG. 4.
Start of Example FIG. 4 shows an example where formulas within cells of the spreadsheet are transformed to initial rules. The initial rules are then grouped together based on aggregations between the labels included in label cells. As shown in FIG. 4, based on the formulas included in cells "E5:E11" and other corresponding cells, a set of initial rules (shown in the box on the bottom left) is derived. These initial rules are then aggregated under a label "Margin-A:1:U290" which is either the title (not shown) of the data block or the title of the worksheet including these cells.
End of Example To further clarify embodiments of the disclosure, a non-limiting working example is provided in FIG. 5.
Start of Example FIG. 5 shows an example where identified levels are combined into label sets. In FIG. 5, a data block delimiting cells "A1:G37" is identified. Cell type classification indicates that columns "product id", "region", "country", "year", and "month" contain cells (e.g., B2:B37) that are label cells, and columns "cost" and "price" contain cells (e.g., F2:F37) that are data cells.

As shown in FIG. 5, one level is created for each column containing cells that are label cells using the heading of the column (e.g., product ID, region, country, etc.) as the title of the level. Another level is created from combining the headings of the columns that contain cells that are data cells (e.g., level=["cost", "price"]).

The labels are grouped into pairs and association scores are then computed for each pair. For example, the level pair of "region" and "country" have the highest overall association score because: they have the same semantic type of GEOGRAPHY; they are in a N:1 relation; and they are directly next to each other within the data block. Pairs of levels with association scores that exceed the association score threshold (e.g., "region" and "country", "year" and "month") are combined into label sets. The "product ID" and "cost/price" levels form label sets of their own.

As also shown in FIG. 5 (namely the box shown in the lower right hand corner of FIG. 5), line items, level hierarchies, and semantic types are identified for the data contained in the data block making up cells "A1:G37".

End of Example

To further clarify embodiments of the disclosure, a non-limiting working example is provided in FIGS. 6.1-6.6.

Start of Example

FIGS. 6.1-6.5 show examples of different ways data forming a generic multi-dimensional model can be displayed to a user. Starting with FIG. 6.1, FIG. 6.1 shows an example where label sets are combined or grouped together to form dimensions. The number of label sets forming each dimension is indicated (e.g., Dimension "FY 2022" includes 8 label sets while dimension "Departments" include 3 label sets. As shown in the expanded portion of FIG. 6.1, the label sets making up the "Departments" dimension are listed. Each label set making up a dimension has common members (i.e., levels) as other label sets within the same dimension. In particular, as shown in FIG. 6.1, the three label sets of the "Department" dimension all have the levels "finance", "sales", "production", and "human resources."

Turning now to FIG. 6.2, FIG. 6.2 shows an example where all data blocks identified within a spreadsheet are listed. Each data block is also listed with all dimensions that one or more structures (e.g., label sets) of the data block is associated with. This information is then used to group the data blocks into data cubes as shown in FIG. 6.3, where each formed data cube is listed with the number of data blocks that make up each data cube. As shown in FIG. 6.3, the data cube "All Cities—Margin" may be formed from the data blocks "New York—A1:T74", "Chicago—A1:T74", "Miami—A1:T74", and "All Cities—A1:T74"). Going back to FIG. 6.2, it is shown that these four data blocks are all associated with the dimensions "FY 2022", "V2", "All Products", and "All Cities-Margin".

As shown in FIG. 6.4, the formed data cubes are shown with the dimension making up each of the data cubes. FIG. 6.5 then shows an example where the initial rules are associated with line items that make up each data cube.

Finally, FIG. 6.6 shows an example of a data model generated using the generic multi-dimensional model shown in FIGS. 6.1-6.5. As shown, the data model presents the data contained in the original spreadsheet used to generate the generic multi-dimensional model shown in FIGS. 6.1-6.5 in a form that is more compact and easier for a user to parse and understand. The relationship/association between the data originally contained in the spreadsheet is made clear through the hierarchical list shown in the example data model. Additionally, the original data in the spreadsheet (shown in the expanded window in the lower right hand corner of FIG. 6.6) may be accessed through the user selecting one of the tabs (e.g., the "All Cities-Margin" tab) included in the data model. As further shown in FIG. 6.6, each tab of the data model corresponds (in the same order) as the "Cubes/Line Item" list shown in the generic multi-dimensional model of FIG. 6.5.

End of Example

Figure 7:
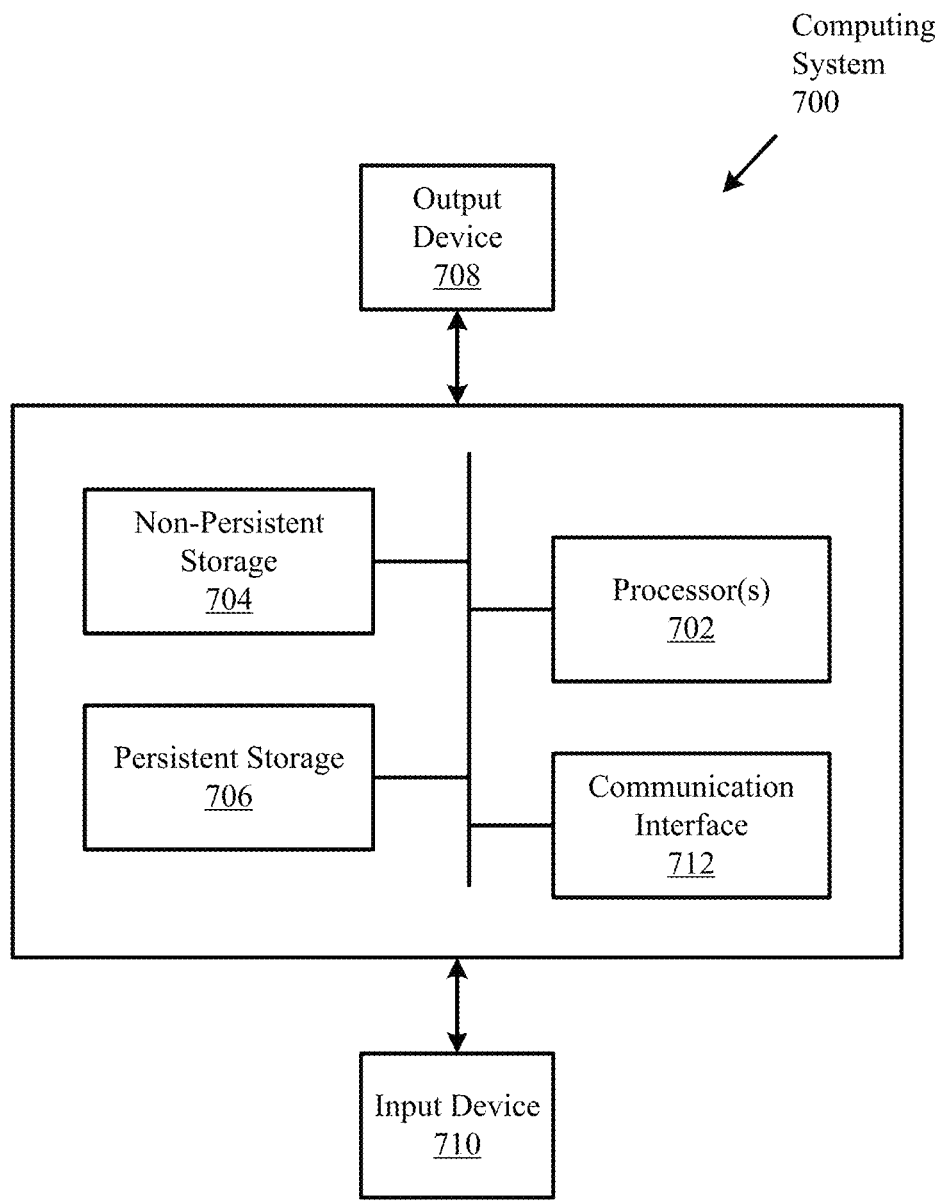
FIG. 7 shows a computer system in accordance to one or more embodiments.

FIG. 7 shows a computer system in accordance to one or more embodiments.

Embodiments disclosed herein may be implemented using computing devices and/or computing systems. FIG. 7 shows a diagram of a computing device in accordance with one or more embodiments disclosed herein. Computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), communication interface (712) (e.g., Bluetooth interface, infrared interface, network interface, optical interface, etc.), input devices (710), output devices (708), and numerous other elements (not shown) and functionalities. Each of these components is described below.

In one embodiment disclosed herein, computer processor(s) (702) may be an integrated circuit for processing instructions. For example, the computer processor(s) may be one or more cores or micro-cores of a processor. Computing system (700) may also include one or more input devices (710), such as a touchscreen, keyboard, mouse, microphone, touchpad, electronic pen, or any other type of input device. Further, communication interface (712) may include an integrated circuit for connecting computing system (700) to a network (not shown) (e.g., a local area network (LAN), a wide area network (WAN) such as the Internet, mobile network, or any other type of network) and/or to another device, such as another computing system.

In one embodiment disclosed herein, computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (702), non-persistent storage (704), and persistent storage (706). Many different types of computing devices exist, and the aforementioned input and output device(s) may take other forms.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for converting a spreadsheet into a data model, the method comprising:
obtaining the spreadsheet, wherein the spreadsheet comprises a plurality of cells containing data;
identifying local structures within the spreadsheet using attributes of the data in the spreadsheet, wherein the local structures comprise data blocks and label sets, wherein identifying comprises:
grouping the plurality of cells into the data blocks based on a cell layout of the plurality of cells and a cell type of each of the plurality of cells, wherein the cell type of each of the plurality of cells comprises label cells and data cells, each of the label cells labels on or more of the data cells, wherein the method further comprises grouping one or more of the label cells that label a data cell of the data cells into a label tuple associated with the data cell, and extracting label sets from the data blocks by applying semantic and structural analysis on the data contained in the plurality of cells making up each of the data blocks, wherein the local structures further comprises a set of rules converted from formulas included in the spreadsheet, wherein generating a first rule of the set of rules using the formulas comprises:

identifying a first cell comprising a first formula of the formulas included in the spreadsheet, wherein the first cell is one of the plurality of cells and is one of the data cells, identifying cells among the plurality of cells referenced by the first formula, identifying the label tuple associated with each of the cells referenced by the first formula, arranging the identified label tuples to make a structure of the first formula, and generating, after the arrangement of the label tuples, the first rule by removing identical labels within the label tuples associated with each of the cells referenced by the first formula;

combining the local structures of the spreadsheet into a generic multi-dimensional model comprising dimensions and data cubes;

generating the data model using the generic multi-dimensional model by mapping elements of the generic multi-dimensional model to elements of the data model, wherein the dimensions and the data cubes are the elements of the generic multi-dimensional model; and displaying, on a display and to a user, the data model.

2. A method for converting a spreadsheet into a data model, the method comprising:

obtaining the spreadsheet, wherein the spreadsheet comprises a plurality of cells containing data;

identifying local structures within the spreadsheet using attributes of the data in the spreadsheet, wherein the local structures comprise data blocks and label sets, wherein identifying comprises:

grouping the plurality of cells into the data blocks based on a cell layout of the plurality of cells and a cell type of each of the plurality of cells, wherein the cell type of each of the plurality of cells comprises label cells and data cells, each of the label cells labels on or more of the data cells, wherein the method further comprises grouping one or more of the label cells that label a data cell of the data cells into a label tuple associated with the data cell, and extracting label sets from the data blocks by applying semantic and structural analysis on the data contained in the plurality of cells making up each of the data blocks, wherein extracting the label sets from the data blocks comprises, for each of the data blocks:

identifying levels in a data block of the data blocks using a structure of the data block and the cell type of each of the plurality of cells making up the data block; and combining the levels into the label sets using the semantic and structural analysis, combining the local structures of the spreadsheet into a generic multi-dimensional model comprising dimensions and data cubes;

generating the data model using the generic multi-dimensional model by mapping elements of the generic multi-dimensional model to elements of the data model, wherein the dimensions and the data cubes are the elements of the generic multi-dimensional model; and displaying, on a display and to a user, the data model.

3. The method of claim 2, wherein each of the levels is associated with at least one of the label sets, and combining the levels into the label sets using the semantic and structural analysis comprises:

assigning a semantic type or a semantic subtype to each of the levels based on the at least one of the label cells associated with each of the levels;

grouping the levels into level pairs and determining an association score for each of the level pairs; and for each of the level pairs and in response to the association score exceeding a predetermined association threshold, combining the levels making up a level pair of the level pairs into a label set of the label sets.

4. The method of claim 3, wherein, for each of the level pairs, the association score is based on at least one selected from a group consisting of:

a semantic compatibility of the levels making up the level pair;

a relation between the levels being 1:N or 1:1;

a distance between the levels within the data block containing the levels;

a string similarity of the levels; and an aggregation formula association based on the levels.

5. The method of claim 3, wherein the method further comprises:

determining whether the levels making up the label set include a hierarchical relationship and arranging the levels within the label sets based on the hierarchical relationship, wherein the hierarchical relationship between the levels is determined using at least the semantic type or the semantic subtype assigned to each of the levels.

6. The method of claim 3, wherein combining the local structures of the spreadsheet into a generic multi-dimensional model comprising dimensions and data cubes comprises:

generating the dimensions by identifying common ones of the label sets and combining the common ones of the label sets into the dimensions;

generating the data cubes using data blocks among the data blocks that include identical line items and identical ones of the dimensions; and associating the line items of each of the data blocks with a set of rules converted from formulas included in the spreadsheet.

7. The method of claim 6, wherein the line items of each of the data blocks are identified by:

selecting one label set from the label sets of each of the data blocks as the line items of each of the data blocks, wherein the one label set is selected as the line items based on the semantic type or the semantic subtype associated with the levels making up the one label set.

8. A non-transitory computer readable medium (CRM) comprising computer readable program code, which when executed by a computer processor enables the computer processor to perform a method for converting a spreadsheet into a data model, the method comprising:

obtaining the spreadsheet, wherein the spreadsheet comprises a plurality of cells containing data;
identifying local structures within the spreadsheet using attributes of the data in the spreadsheet, wherein the local structures comprise data blocks and label sets, wherein identifying comprises:
grouping the plurality of cells into the data blocks based on a cell layout of the plurality of cells and a cell type of each of the plurality of cells, wherein the cell type of each of the plurality of cells comprises label cells and data cells, each of the label cells labels one or more of the data cells, wherein the method further comprises grouping one or more of the label cells that label a data cell of the data cells into a label tuple associated with the data cell, and
extracting label sets from the data blocks by applying semantic and structural analysis on the data contained in the plurality of cells making up each of the data blocks,
wherein the local structures further comprises a set of rules converted from formulas included in the spreadsheet, wherein generating a first rule of the set of rules using the formulas comprises:
identifying a first cell comprising a first formula of the formulas included in the spreadsheet, wherein the first cell is one of the plurality of cells and is one of the data cells,
identifying cells among the plurality of cells referenced by the first formula,
identifying the label tuple associated with each of the cells referenced by the first formula,
arranging the identified label tuples to make a structure of the first formula, and
generating, after the arrangement of the label tuples, the first rule by removing identical labels within the label tuples associated with each of the cells referenced by the first formula;
combining the local structures of the spreadsheet into a generic multi-dimensional model comprising dimensions and data cubes;
generating the data model using the generic multi-dimensional model by mapping elements of the generic multi-dimensional model to elements of the data model, wherein the dimensions and the data cubes are the elements of the generic multi-dimensional model; and
displaying, on a display and to a user, the data model.

9. A non-transitory computer readable medium (CRM) comprising computer readable program code, which when executed by a computer processor enables the computer processor to perform a method for converting a spreadsheet into a data model, the method comprising:
obtaining the spreadsheet, wherein the spreadsheet comprises a plurality of cells containing data;
identifying local structures within the spreadsheet using attributes of the data in the spreadsheet, wherein the local structures comprise data blocks and label sets, wherein identifying comprises:
grouping the plurality of cells into the data blocks based on a cell layout of the plurality of cells and a cell type of each of the plurality of cells, wherein the cell type of each of the plurality of cells comprises label cells and data cells, each of the label cells labels on or more of the data cells, wherein the method further comprises grouping one or more of the label cells that label a data cell of the data cells into a label tuple associated with the data cell, and
extracting label sets from the data blocks by applying semantic and structural analysis on the data contained in the plurality of cells making up each of the data blocks, wherein extracting the label sets from the data blocks comprises, for each of the data blocks:
identifying levels in a data block of the data blocks using a structure of the data block and the cell type of each of the plurality of cells making up the data block; and
combining the levels into the label sets using the semantic and structural analysis,
combining the local structures of the spreadsheet into a generic multi-dimensional model comprising dimensions and data cubes;
generating the data model using the generic multi-dimensional model by mapping elements of the generic multi-dimensional model to elements of the data model, wherein the dimensions and the data cubes are the elements of the generic multi-dimensional model; and
displaying, on a display and to a user, the data model.

10. A computing device comprising:
a memory storing a spreadsheet; and
a processor coupled to the memory, wherein the processor is configured to convert the spreadsheet into a data model by:
obtaining the spreadsheet, wherein the spreadsheet comprises a plurality of cells containing data;
identifying local structures within the spreadsheet using attributes of the data in the spreadsheet, wherein the local structures comprise data blocks and label sets, wherein identifying comprises:
grouping the plurality of cells into the data blocks based on a cell layout of the plurality of cells and a cell type of each of the plurality of cells, wherein the cell type of each of the plurality of cells comprises label cells and data cells, each of the label cells labels on or more of the data cells, wherein the method further comprises grouping one or more of the label cells that label a data cell of the data cells into a label tuple associated with the data cell, and
extracting label sets from the data blocks by applying semantic and structural analysis on the data contained in the plurality of cells making up each of the data blocks,
wherein the local structures further comprises a set of rules converted from formulas included in the spreadsheet, wherein generating a first rule of the set of rules using the formulas comprises:
identifying a first cell comprising a first formula of the formulas included in the spreadsheet, wherein the first cell is one of the plurality of cells and is one of the data cells,
identifying cells among the plurality of cells referenced by the first formula,
identifying the label tuple associated with each of the cells referenced by the first formula,
arranging the identified label tuples to make a structure of the first formula, and
generating, after the arrangement of the label tuples, the first rule by removing identical labels within the label tuples associated with each of the cells referenced by the first formula;

combining the local structures of the spreadsheet into a generic multi-dimensional model comprising dimensions and data cubes;

generating the data model using the generic multi-dimensional model by mapping elements of the generic multi-dimensional model to elements of the data model, wherein the dimensions and the data cubes are the elements of the generic multi-dimensional model; and displaying, on a display and to a user, the data model.

11. A computing device comprising:

a memory storing a spreadsheet; and a processor coupled to the memory, wherein the processor is configured to convert the spreadsheet into a data model by:

obtaining the spreadsheet, wherein the spreadsheet comprises a plurality of cells containing data;

identifying local structures within the spreadsheet using attributes of the data in the spreadsheet, wherein the local structures comprise data blocks and label sets, wherein identifying comprises:

grouping the plurality of cells into the data blocks based on a cell layout of the plurality of cells and a cell type of each of the plurality of cells, wherein the cell type of each of the plurality of cells comprises label cells and data cells, each of the label cells labels on or more of the data cells, wherein the method further comprises grouping one or more of the label cells that label a data cell of the data cells into a label tuple associated with the data cell, and extracting label sets from the data blocks by applying semantic and structural analysis on the data contained in the plurality of cells making up each of the data blocks, wherein extracting the label sets from the data blocks comprises, for each of the data blocks:

identifying levels in a data block of the data blocks using a structure of the data block and the cell type of each of the plurality of cells making up the data block; and combining the levels into the label sets using the semantic and structural analysis, combining the local structures of the spreadsheet into a generic multi-dimensional model comprising dimensions and data cubes;

generating the data model using the generic multi-dimensional model by mapping elements of the generic multi-dimensional model to elements of the data model, wherein the dimensions and the data cubes are the elements of the generic multi-dimensional model; and displaying, on a display and to a user, the data model.

* * * * *